United States Patent
Lowry

[11] Patent Number: 5,278,380
[45] Date of Patent: Jan. 11, 1994

[54] SUPERCONDUCTING MAGNET SYSTEM WITH INDUCTIVE QUENCH HEATERS

[75] Inventor: Jerald F. Lowry, Penn Hills Township, Allegheny County, Pa.

[73] Assignee: Westinghouse Electric Corp., Pittsburgh, Pa.

[21] Appl. No.: 620,879

[22] Filed: Dec. 3, 1990

[51] Int. Cl.⁵ .......................... H05B 6/10; H01F 7/00
[52] U.S. Cl. ........................ 219/635; 361/19; 361/141; 335/216; 505/851; 219/660; 219/672
[58] Field of Search .............. 219/10.57; 361/19, 141; 335/216; 505/850, 851, 892

[56] References Cited

U.S. PATENT DOCUMENTS

| | | | |
|---|---|---|---|
| 3,474,294 | 12/1969 | Weaver, Jr et al. | 361/141 |
| 3,711,744 | 1/1973 | Luton, Jr. | 361/19 |
| 4,688,137 | 8/1987 | Urata | 361/141 |
| 4,807,084 | 2/1989 | Takechi | 361/141 |
| 4,812,796 | 3/1989 | Ries | 335/216 |
| 4,816,962 | 3/1989 | Yamada et al. | 361/141 |
| 4,926,289 | 5/1990 | Reichert | 361/141 |
| 4,956,740 | 9/1990 | Williams | 361/19 |

*Primary Examiner*—Philip H. Leung
*Attorney, Agent, or Firm*—M. G. Panian

[57] ABSTRACT

A superconducting magnet coil is protected from local damage due to quenching by inductively driven heaters formed by heater strips embedded in the coil and connected in closed loops. A cold bypass diode shunting the coil winding commutates current out of the magnet when the voltage drop across the region of the coil which has gone normal exceeds the forward bias of the diode. This change in coil current induces sufficient current in the heater loops to cause the entire coil to go normal for uniform dissipation of stored energy throughout the magnet.

10 Claims, 6 Drawing Sheets

SUPERCONDUCTING MAGNET SYSTEM WITH INDUCTIVE QUENCH HEATERS

BACKGROUND OF THE INVENTION

Field of the Invention

This invention relates to superconducting magnet systems with provisions for protecting the magnet when a section quenches or goes normal. More particularly, it relates to such systems having heaters which uniformly cause the entire coil to go normal for dissipation of the stored energy throughout the coil.

Background Information

In superconducting magnets, there are small regions of the superconducting winding, such as soldered or welded splice joints between superconducting cables, areas subject to frictional heating or excessive strain, and others, which may become normal conductors during magnet operation. That is, in such regions, the conductors become resistive rather than superconductors, and resistive power loss is generated by the passage of current. Generally, the superconductors are designed such that any small, local, "normal", region will not grow in volume beyond a certain size or begin to propagate along the winding but, rather, will recover to the superconducting state. However, in certain events, such a region may begin to grow in volume and/or propagate, with ever increasing resistive power losses. Such an event is frequently referred to as a "coil quench", and quench detection systems are provided for detecting such events. It is very important to detect such regions quickly so that measures can be taken to protect the magnet, which will most likely result in dumping the energy stored in the coil. This energy must be distributed relatively uniformly throughout the magnet, and not in some small region, to minimize the peak temperature developed in the magnet and the possibility of damage to the winding.

One type of superconducting magnet is the magnet being developed for the superconducting supercollider (SSC). The SSC uses thousands of superconducting dipole magnets to direct two beams of protons in closed loops or rings. Groups of about 400 SSC dipoles are powered by a common dc power supply. Dipole magnets in each group are organized into cells of ten or twelve magnets which are energized by common buses. The cells are further divided into half-cells. Each half-cell also includes a quadrupole magnet which focuses the proton beam.

The presently conceived quench system for the SSC magnet is an active system, that is the magnets are not assumed to be self-protecting, but devices external to the magnet are activated during a quench to protect and bypass a quenching magnet. This active system combines a fast quench bypass circuit and a slow current extraction system. The slow current extraction system consists of dump resistors and high power electronic and mechanical switches which are inserted into the magnet circuit following the detection of a quench. The quench detection system consists of voltage taps at the terminals of each magnet. The fast quench bypass system consists of cold-to-warm leads, external bypass cables and warm diodes which shunt the half-cell containing the quenching magnet. Strip heaters are embedded inside the coils to distribute and enhance the quenching resistance, causing the stored energy to be more uniformly distributed throughout the magnet mass. Upon detection of a magnet quench, all the heaters in the magnets comprising a half-cell are energized using capacitor banks and electronic switches. The magnet current commutates into the warm bypass diodes and then begins to decay as the dump resistors are switched into the circuit.

The current bypass system as now conceived uses two heavily stabilized superconducting buses located in the cold mass, just outside and extending the entire length of the iron in the magnets. Each half-cell of magnets is protected by independent bypass circuits outside the cryostat, with leads connecting to the positive and negative power buses in the magnets. The basic bypass switch consists of two warm diodes connected in series. If, for any reason, the voltage drop across a half-cell begins to exceed about one volt, current will begin to commutate into the diodes.

This scheme requires the use of two safety leads at every quadrupole location on both rings to connect the warm diodes to the superconducting magnet bus. These leads must penetrate the several barriers within the cryostat in which the magnets are contained. Helium vapor-cooled leads are proposed for these warm diodes for rapid recovery after a quench and to minimize heat leak. Heat sinks are required for the warm diodes since they are expected to absorb the energy deposited during one bypass event without overheating and failure.

Eight quench heater power supplies are used for each magnet cell with four of the supplies being redundant. Hundreds of these power supplies are needed for the SSC. While these power supplies, each of which contain a large energy storage capacitor, are not particularly expensive, their sheer number is relevant to the reliability of the active quenching system because of their potential for false triggering or failure to trigger when required. All of these power supplies must be fully charged waiting for a trigger signal throughout the duration of SSC beam operations, that is, starting with beam acceleration and lasting until residual beam dump.

It is the primary object of this invention to provide a superconducting magnet system with improved protection against a quench.

It is a more particular object of the invention to provide such a system which eliminates the need for hundreds of quench heater power supplies together with the required monitoring, control and triggering circuitry.

It is also an object of the invention to provide such a system which eliminates the need for warm diodes and the vapor cooled leads required with these diodes for penetrating the multiple layered cryostat.

It is a further object of the invention to provide such a system in which each magnet is separately protected from a quench.

It is yet another object of the invention to provide such a system wherein there is redundancy in the separate protection for each magnet.

SUMMARY OF THE INVENTION

These and other objects are realized by the invention which is directed to a superconducting magnet system having protection against quench events which includes inductive heaters comprising elongated closed loop heater members adjacent to the magnet coils. The system further includes diodes, preferably cold diodes contained within the cryostat, connected across the magnet coils. Since the cold diodes do not require penetrations through the cryostat, each magnet coil can be separately shunted by a diode.

The closed loop formed by each of the elongated heater members is oriented such that a change in the magnetic flux generated by the magnet induces current in the heater loop.

The diodes have a forward drop which is exceeded by a voltage produced across the magnet coil by a quench event. Thus, a quench event causes the bypassing diode to conduct thereby shunting current from the winding of the magnet. This commutation of current out of the magnet causes a change in the flux which induces current in the heaters sufficient to cause the remainder of the magnet to go normal, thereby dissipating the stored energy throughout the magnet. A pair of independent inductive heaters is provided for each magnet coil for redundancy.

BRIEF DESCRIPTION OF THE DRAWINGS

A full understanding of the invention can be gained from the following description of the preferred embodiment when read in conjunction with the accompanying drawings in which:

FIG. 6 is a schematic circuit diagram of an alternate embodiment of an inductive heater in accordance with the invention.

DESCRIPTION OF THE PREFERRED EMBODIMENT

The invention will be described as applied to a superconducting supercollider; however, it will become evident to those skilled in the art that the invention has application to other superconducting magnet systems.

Figure 1:
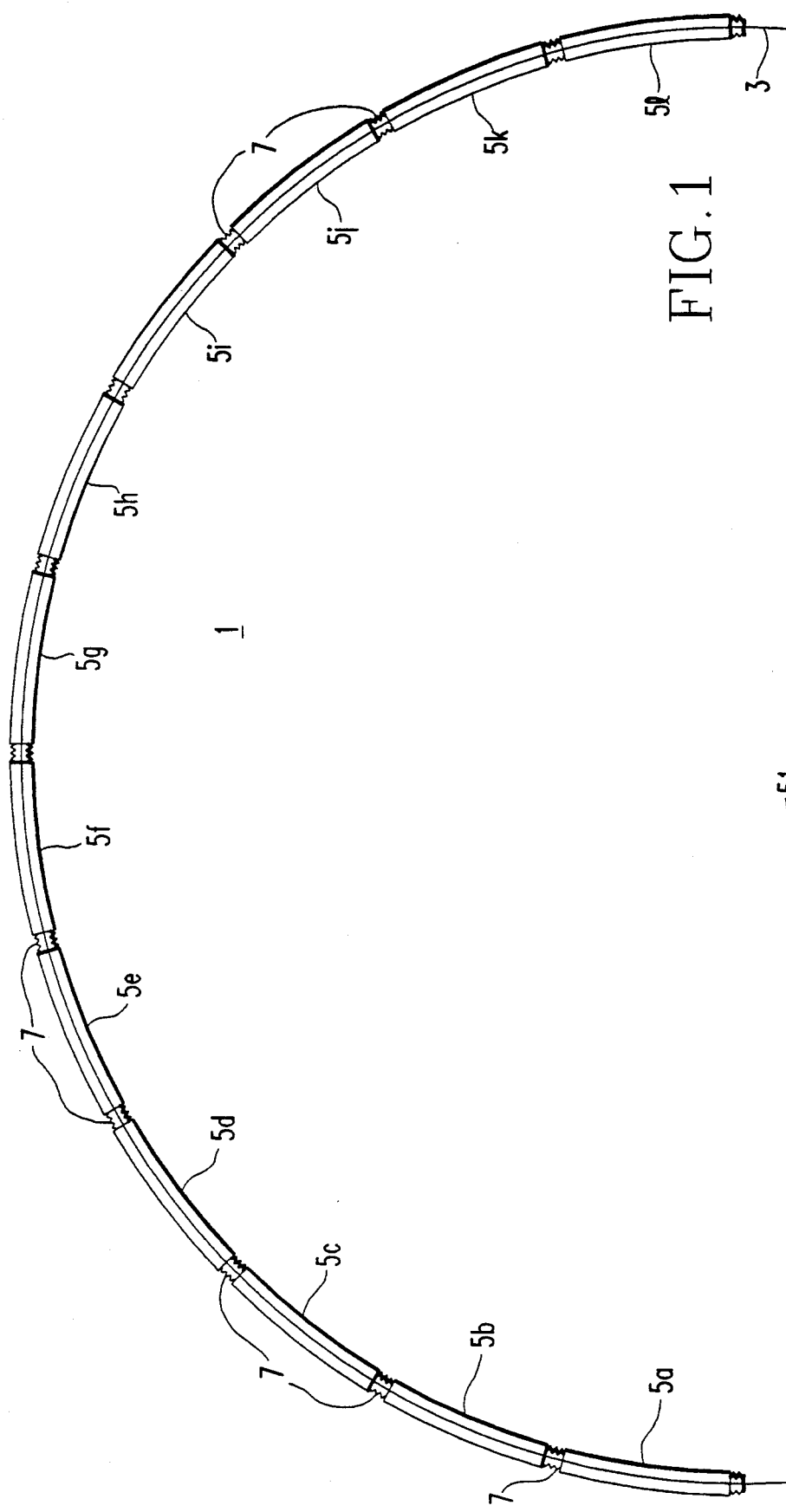
FIG. 1 is a schematic diagram of a portion of a superconducting supercollider incorporating the invention.

Referring to FIG. 1, the superconducting supercollider (SSC) 1 defines a closed path 3 for a beam of protons. In the curved sections of the closed path 3, the SSC includes a series of magnets such as 5a through 5l serially connected through bellows 7. The magnets 5a through 5l are dipoles which generate a field to deflect the protons along the desired path 3. (For simplicity, the quadrupole magnets are not illustrated.) The desired path 3 is many miles long and several thousand of the magnets 5a through 5l, each of which are about 52 feet long, are required to define the curved sections of the path. The curvature is exaggerated in FIG. 1 for purposes of illustration.

Figure 2:
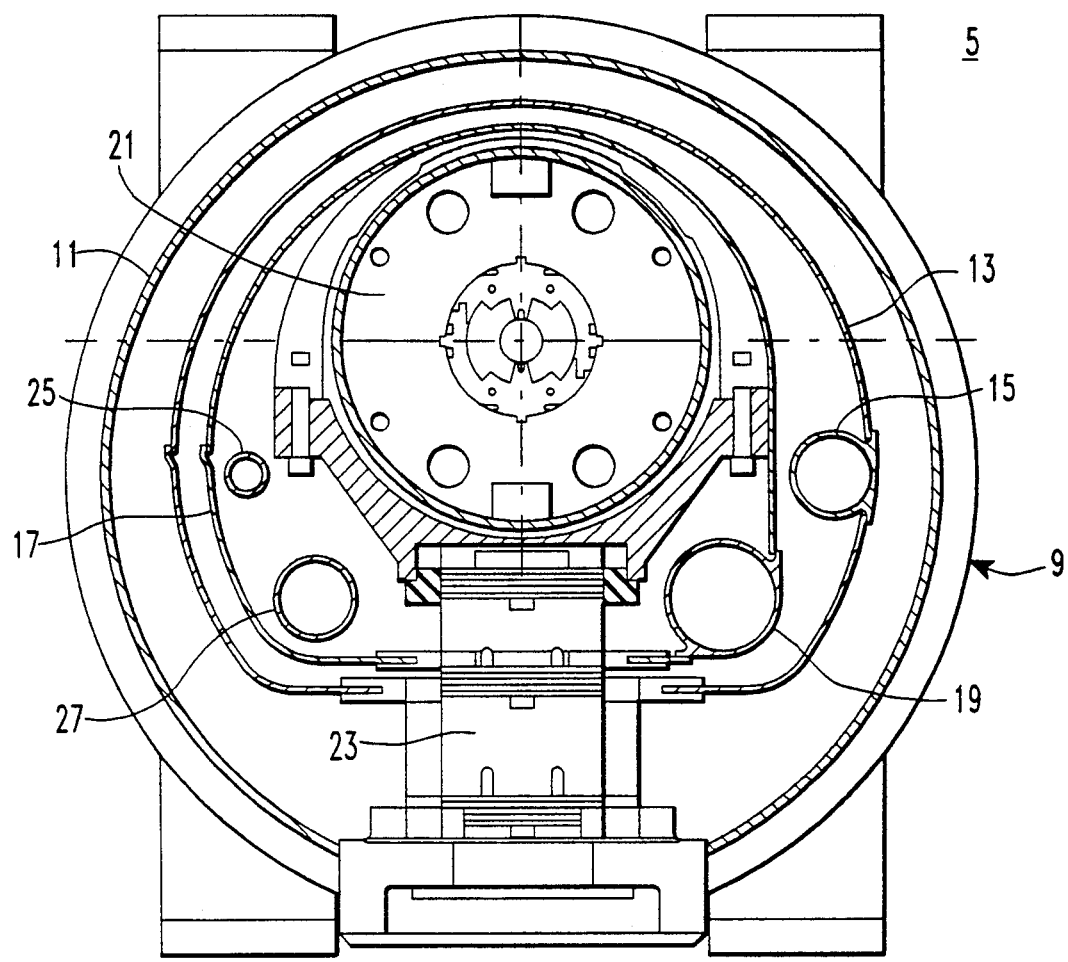
FIG. 2 is a vertical cross-section through one of the magnets of the SSC of FIG. 1.

FIG. 2 is a cross-section through one of the dipole magnets 5. A multilayered cryostat 9 includes a vacuum vessel 11. Inside the vacuum vessel is an 80° K. shield 13 which is cooled by liquid nitrogen supplied through a pipe 15, a 20° K. shield 17 inside the 80° K. shield 13 is cooled by 20° K. helium circulated through the pipe 19.

A cold mass assembly 21 is supported inside the 20° K. shield 17 of the cryostat 9 on a post 23. Liquid helium at 4.35° K. is circulated through the cold mass assembly, as will be discussed. The 4.35° K. helium liquid is returned through the pipe 25 and the 4.35° K. helium gas is returned through pipe 27 both of which are inside the 20° K. shield 17.

Figure 3:
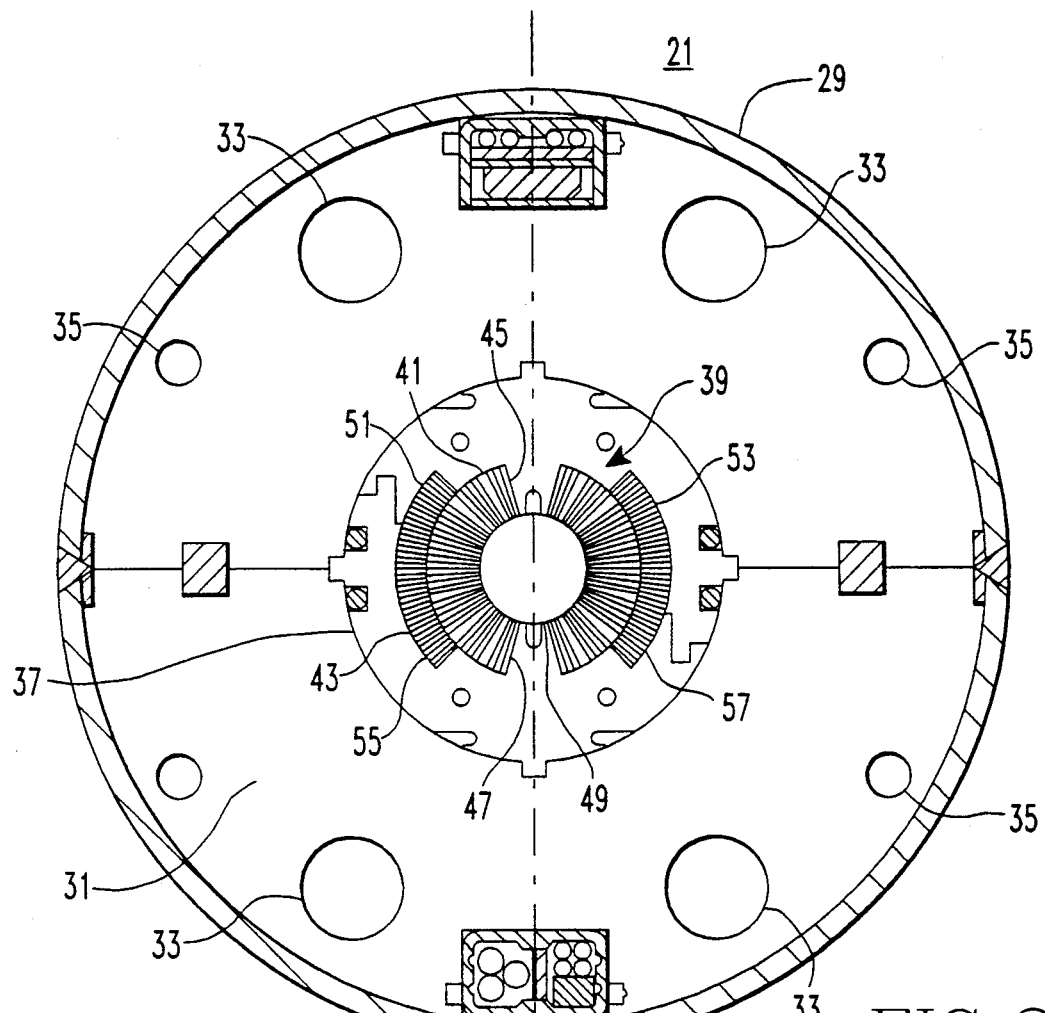
FIG. 3 is an enlargement of the cold mass assembly shown in the cross-section of FIG. 2.

The cold mass assembly 21 is shown in enlarged scale in FIG. 3. The cold mass assembly 21 includes a stainless steel shell 29 inside of which is a two-piece yoke 31. The yoke has axially extending helium ports 33 through which 4.35° K. liquid helium is circulated and heater holes 35 through which electric heaters extend for magnet warm-up during shutdown of the SSC. Inside the low carbon steel yoke 31 is a magnetically permeable collar 37 which can be for instance a material such as Nitronic-40. Collar 37 supports the winding of the dipole magnetic coil 39. The magnetic coil 39 includes upper and lower outer windings 41 and 43 respectively and upper and lower inner windings 45 and 47 all connected in series. The magnetic coil surrounds a beam tube 49 through which the proton beam passes. The magnetic dipole coil 39 generates a uniform vertical magnetic field across the beam tube 49 with the strength of the field regulated to induce the desired curvature of the proton beam at the attained energy level of the beam. Heater strips 51, 53, 55 and 57 are attached to the two halves of the upper and lower outer windings of the magnetic coil 39, respectively.

Figure 4:
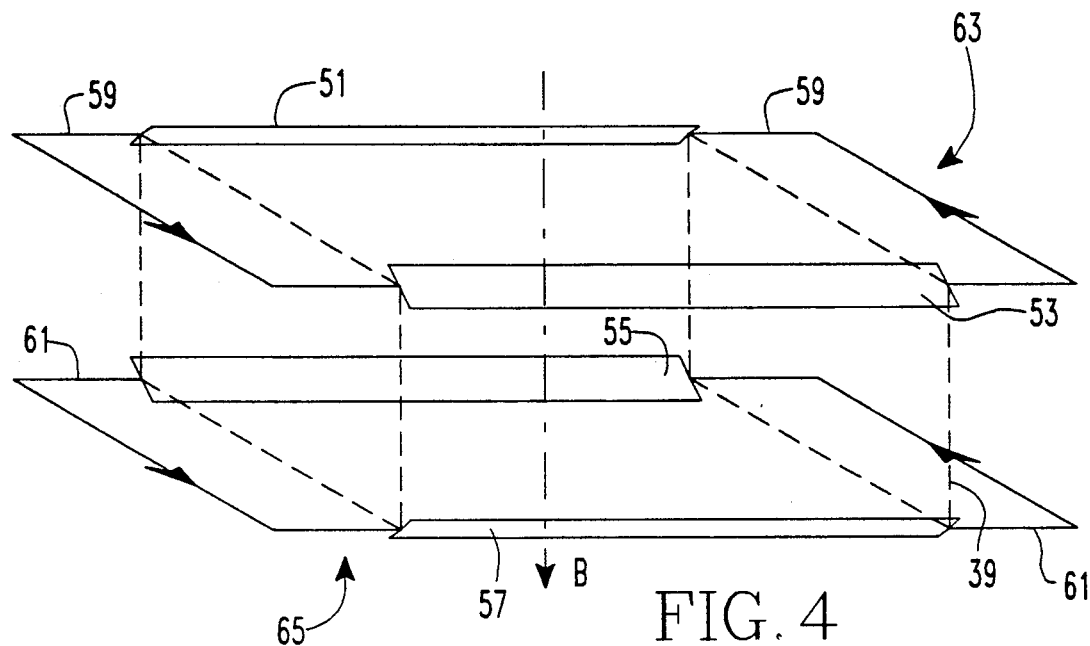
FIG. 4 is an isometric diagram schematically illustrating the inductive heaters which form part of the invention.

As shown in FIG. 4, the heater strips 51, 53, 55 and 57 extend longitudinally along the full length of the magnetic coil indicated schematically at 39. The heater strips 51 and 53 are joined at opposite ends by conductors 59 to form a closed loop. Similarly, the heater strips 55 and 57 are connected in series by the conductor 61. Thus, two separate independent heater loops 63 and 65, are provided for each magnet coil 39.

Figure 5A:
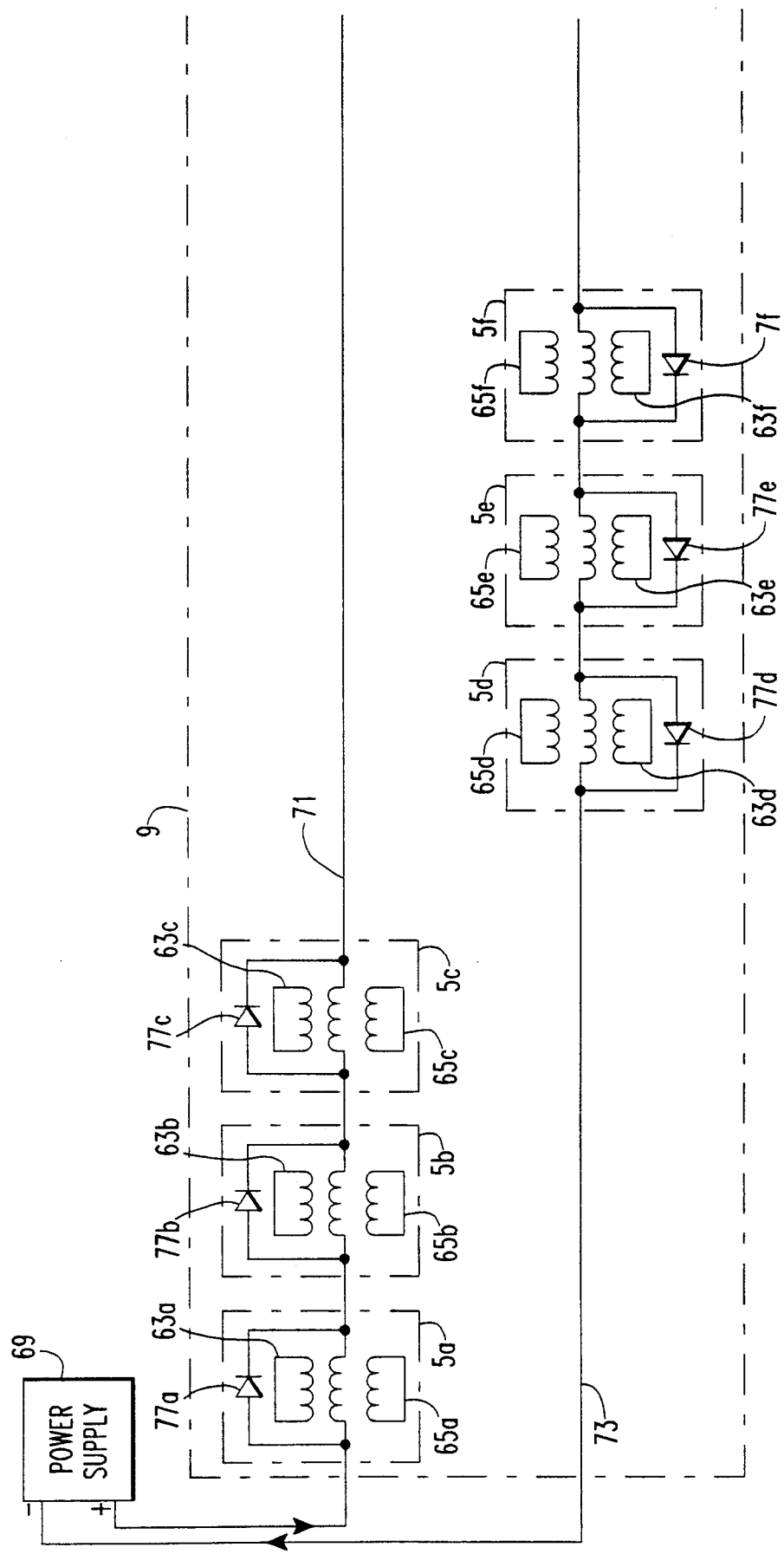
FIGS. 5A and 5B placed side by side illustrate a schematic circuit diagram of a cell of the SSC of FIG. 1 in accordance with the invention.
Figure 5B:
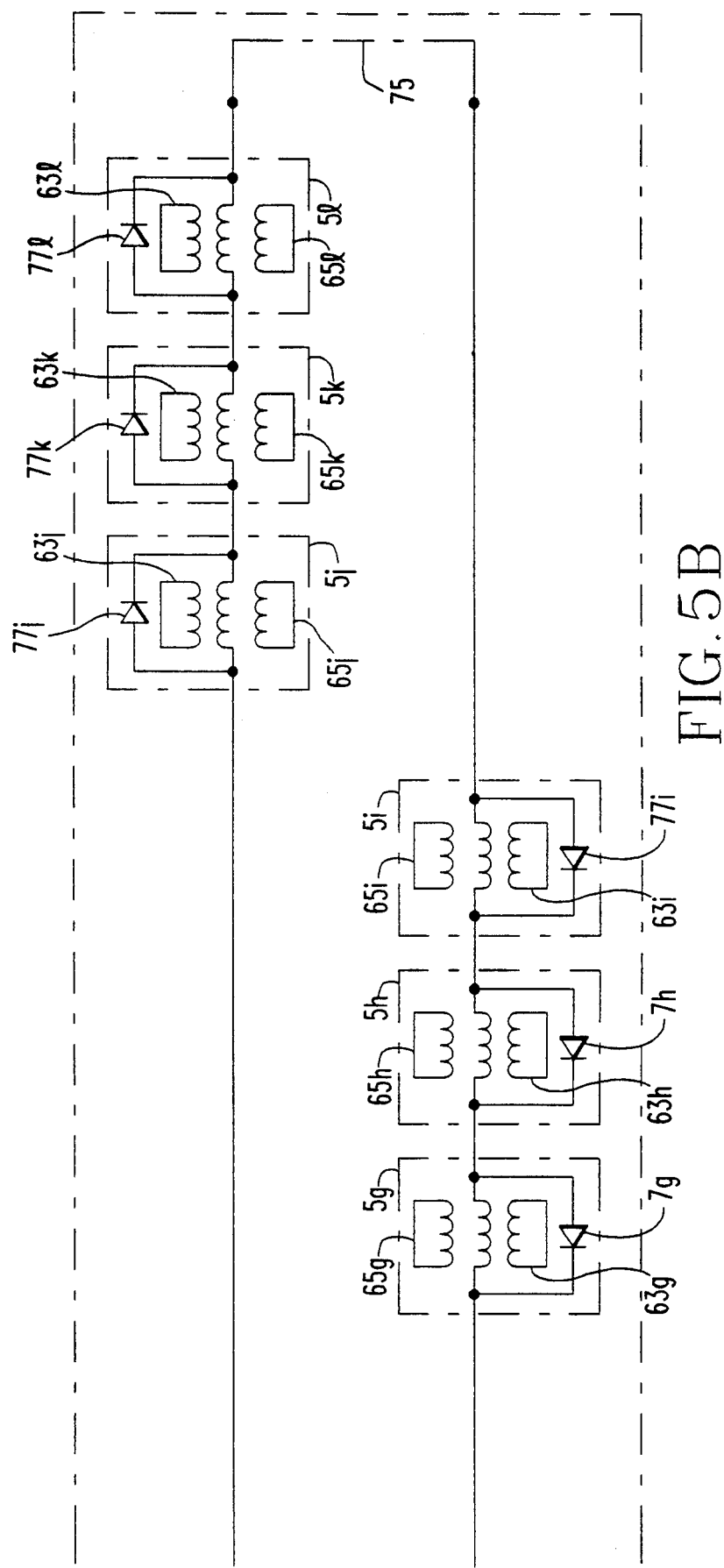

FIGS. 5A and 5B illustrate schematically a circuit diagram for the cell of magnets 67 comprising the magnets 5a through 5l. (For simplicity, the quadrupole magnets are not shown.) A dc power supply 69 provides current to about 400 of the magnets 5 over a pair of parallel buses 71 and 73. The magnets 5a-5c and 5j-5l are connected in series by the bus 71, while the remaining magnets in the cell, 5d-5i, are connected in series by the bus 73. The buses 71 and 73 are connected in series at the end 75. As can be seen, each of the magnets 5a through 5l is provided with independent heater loops 63a through 63l and 65a-l which require no external power sources. Each of the magnets 5a-l is shunted by a cold diode 77a-77l. By cold diode, it is meant that the diodes 77 are contained in the cold region inside the cryostat 9. Thus, no penetrations through the cryostat 9 are required as in the case of warm diodes.

As previously discussed, the heater strips 51, 53, 55 and 57 in accordance with the invention, are powered by magnetic induction. While at full current, each magnet 5a through 5l stores in excess of one megajoule; it is only necessary to transfer a small fraction of this energy to the quench heater strips during the first 25-50 ms. following quench initiation, in the range of about 0.01%-0.05% distributed uniformly, to quench the entire magnet and assure uniform energy deposition of the full one megajoule.

At initiation of a magnetic quench in one of the magnets 5a-5l, the voltage across the terminals of that magnet will increase very rapidly. The cold quench bypass diode 77 shunting that magnet will begin to carry current when the magnet terminal voltage exceeds the diode forward voltage drop; that is, current will begin to commutate out of the magnet and into the diode, and the magnet current will begin to decay, with a time constant on the order of 50–500 ms. The forward drop of a diode operating at 4.35° K. is about 2.5–5 volts. However, as current passes through the diode, the diode heats and its forward drop will fall to about 0.7 to 1.0 volts causing the magnet current to commutate to the diode. The dipole field of the magnet 5 will decay in accordance with the current and this change in flux with time will induce a voltage in the strip heater loops 63 and 65 embedded in the magnet windings. Current will begin to flow in the strip heater loops 63 and 65, in such a direction as to establish a magnetic field which opposes the decaying dipole field. The instantaneous current will have exactly the same value everywhere along the strip heater loop. It should be noted that both the resistance of the heater loops 63 and 65 and the induced current in these loops are functions of time. The strip heater resistance is a function of temperature, and the temperature increases with time as energy is deposited in the heater. The heater current is a complex function of time; it depends on the self-inductance of the heater loops, the mutual inductance of the heater loop with the dipole windings, the rate of change of current in the dipole magnetic winding, and the time varying resistance of the heater loop. Based on work to date in which certain approximations have been made, it is expected that a sufficient quantity of energy can be inductively transferred from the dipole magnet windings to the strip heaters during the first 0.1 to 0.25 of the time constant of the decaying current in the dipole after quench initiation to quench the entire magnet relatively uniformly.

Consideration must be given to whether the induction heaters of the invention could respond adequately to the development within a magnet of a small, "locked-in" normal region, that is, a small region which quenches but the quench neither grows larger nor propagates away from its initiation point; yet the temperature of this normal region increases rapidly to the point where the winding is damaged. Consider a one meter long section of a coil winding which quenches at a magnet current of 2 kA. At a temperature of 10° K., the resistance of the dipole superconducting cable is about 0.40 micro-ohms per centimeter (zero field), and the voltage drop across this normal region is about 80 mV. This voltage level is probably not easily detectable at the magnetic voltage taps, and will not cause current to commutate out of the magnet to the cold bypass diode. However, the cable will continue to heat. At room temperature, its resistance is about 26 micro-ohms per cm, with a resulting voltage drop of 5.2 volts within the one meter section. However, as discussed above, the cold diode will begin to conduct at about 2.5–5 volts forward drop, and as the diode heats its forward drop will fall to about 0.7–1.0 volts causing the magnet current to commutate to the diode. Thus, a "locked-in" normal zone only one meter long will certainly be detectable well before its temperature reaches 300° K., causing commutation of the magnet current to the bypass diode and inductive activation of the quench heaters.

Another issue to be considered is the availability of suitable high power silicon diodes, and survivability of such diodes at liquid helium temperatures and the radiation environment of the SSC, and for the projected 30-year operating life of the SSC. Properties of high current silicon diodes operating at liquid helium temperatures are well known and are ideally suited for this application. The diode forward voltage drop, which is on the order of 2.5 V at 4.4° K. is high enough to prevent diode conduction during magnet current ramp-up and routine SSC operation, yet low enough to protect a quenching magnet. In addition, the reverse voltage rating is high enough to prevent reverse breakdown during magnetic current dump (ramp-down). The primary effect of diode operation at 4.4° K. is to increase the diode forward voltage drop as discussed from about 0.7 volts to about 2.5 volts. As current begins to flow through the bypass diode following a magnet quench, the diode heats and forward drop decreases, thus causing more of the current to commutate into the diode. The diode thus acts as a reasonably fast "switch" to shunt a quenching magnet; however, the energy stored in the magnet is still dissipated in the magnet. An investigation has found that available silicon power diodes, such as for instance, the Brown-Boveri DS6000 rated at $I_{frms}=14,200$ A, $V_{rrm}=200$ V, are expected to experience no systematic failure due to radiation damage over the projected 30-year operating life time of the SSC.

Consideration has also been given to the amount of energy that will be deposited in the magnet by the inductively driven quench heater strips during current ramp-up. Since the current ramp-up rate is expected to be only 6 A/s, the rate of change of flux during ramp-up should be at least three orders of magnitude less than the negative rate of change in flux during a magnet quench. Since the magnet temperature remains at 4.4° K. during ramp-up, quench heater strip resistivity remains low, helping to minimize the amount of energy deposited. Thus, current ramp-up does not appear to present a problem. If it does, a cold diode 79 could be inserted in the heater loops, such as the loop 63 comprising the heater strips 51 and 53 as shown in FIG. 6, polarized to block current flow during ramp-up but still allowing current to flow in the opposite direction for decreasing coil current.

Figure 7:
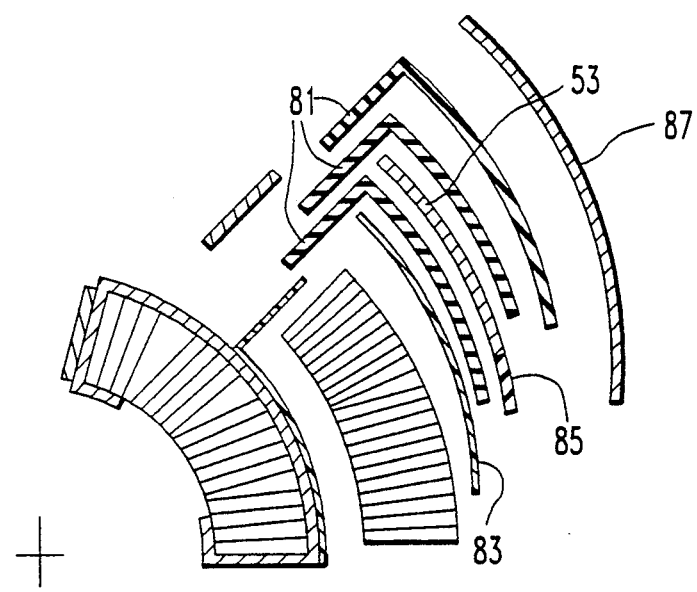
FIG. 7 is a fragmentary exploded view of a portion of FIG. 3 in enlarged scale illustrating the details of the heaters in accordance with the invention.

FIG. 7 illustrates a coil quadrant showing the placement of the heater strips adjacent to the coil windings. The heater strips such as the strip 53 are sandwiched between layers 81 of insulating material, such as for instance, Kapton, and placed against the outer surface of the outer coils which is covered by another layer of insulation 83 which may be for instance, Teflon. A strip 85 of insulating material such as again Kapton, fills the gap adjacent to the heater strip. A stainless steel shoe 87 prevents puckering of the Kapton during collaring of the coil assembly. As mentioned previously, the amount of heat deposited by the heater strips such as 53, is a complex function of the resistivity and the induced current both of which vary with time. Typically, a heater strip may be made of thin stainless steel or other alloy or metal sheet, 0.001 to 0.025 inches thick, either uniformly solid or with certain portions of the sheet cut away to effectively increase the resistive path length. Certain portions of the strip may be coated with copper or aluminum to effectively lower the resistivity where only minimal heating is desired.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A superconducting magnet system comprising;
   a superconducting magnet assembly having magnet coil means; and
   a cryostat in which said superconducting magnet assembly is contained and cooled to a superconducting temperature by a cryogenic fluid;
   heater means comprising elongated closed loop heater members extending along said magnet coil means and oriented such that a change in magnetic flux in said magnet coil means induces current in said heater members; and
   bypass diode means connected across said magnet coil means and commutating current out of said coil in response to a voltage drop across the magnet coil means resulting from a quench within the magnet coil to produce a change in magnetic flux in the magnet coil means of a magnitude to induce current in said heater members sufficient to heat a substantial portion of the magnet coil means to a temperature above said superconducting temperature.

2. The system of claim 1 wherein said bypass diode means is contained entirely within said cryostat.

3. The system of claim 1 wherein said heater means comprises at least two independent elongated closed loop heater members extending along said magnet coil means.

4. The system of claim 1 wherein said heater members comprise a pair of strips of non-superconducting material extending generally along the length of said magnet coil means and conductors at the ends of said strips connecting said strips into a closed loop.

5. The system of claim 4 wherein said heater means comprises at least two heater members each comprising a pair of strips of non-superconducting material extending generally along the length of the magnet coil means and conductors at the end of the strips of each pair connecting each said pair of strips into independent closed loops.

6. The system of claim 5 wherein said bypass diode is contained entirely within said cryostat.

7. The system of claim 4 including a blocking diode in said closed loop formed by said strips and said conductors, said blocking diode being polarized to block current during ramp-up of current into the magnetic coil means and for passing current induced in said heater means by commutation by said bypass diode of current from the magnet coil means.

8. The system of claim 1 wherein said magnet assembly includes a plurality of serially connected superconducting magnets each having a magnetic coil means, wherein said heater means comprises elongated closed loop heater members extending along each magnet coil means, and wherein said bypass diode means includes a bypass diode connected across each preselected number magnet coils.

9. The system of claim 8 wherein said preselected number of magnet coils is one.

10. The system of claim 9 wherein said bypass diode is contained entirely within said cryostat.

* * * * *